United States Patent
Caminada et al.

(10) Patent No.: US 7,481,111 B2
(45) Date of Patent: Jan. 27, 2009

(54) MICRO-ELECTRO-MECHANICAL SENSOR WITH FORCE FEEDBACK LOOP

(75) Inventors: Carlo Caminada, Rho (IT); Ernesto Lasalandra, San Donato Milanese (IT); Luciano Prandi, Bellinzago Novarese (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 11/843,579

(22) Filed: Aug. 22, 2007

(65) Prior Publication Data

US 2007/0289382 A1  Dec. 20, 2007

Related U.S. Application Data

(62) Division of application No. 11/195,363, filed on Aug. 2, 2005, now Pat. No. 7,275,433.

(30) Foreign Application Priority Data

Aug. 3, 2004  (EP) .................................. 04425600

(51) Int. Cl.
   *G01P 15/00* (2006.01)
(52) U.S. Cl. ................. 73/514.18; 73/504.12; 73/503.3
(58) Field of Classification Search .............. 73/514.18, 73/504.12, 503.3
   See application file for complete search history.

(56) References Cited

U.S. PATENT DOCUMENTS

| | | | |
|---|---|---|---|
| 5,627,318 A * | 5/1997 | Fujii et al. ................ | 73/514.32 |
| 5,719,460 A | 2/1998 | Watarai et al. | |
| 6,253,612 B1 * | 7/2001 | Lemkin et al. ............ | 73/504.02 |
| 6,701,786 B2 * | 3/2004 | Hulsing, II ................ | 73/514.02 |
| 6,766,689 B2 * | 7/2004 | Spinola Durante et al. ....................... | 73/504.04 |
| 6,823,733 B2 * | 11/2004 | Ichinose ................... | 73/504.02 |
| 6,934,665 B2 | 8/2005 | Rober | |
| 7,275,433 B2 | 10/2007 | Caminada et al. | |
| 7,305,880 B2 | 12/2007 | Caminada et al. | |
| 2001/0037683 A1 * | 11/2001 | Nozoe et al. .............. | 73/504.16 |
| 2002/0178813 A1 * | 12/2002 | Babala ..................... | 73/504.02 |
| 2002/0189354 A1 * | 12/2002 | Durante et al. ........... | 73/504.12 |
| 2006/0032309 A1 | 2/2006 | Caminada et al. | |
| 2006/0033588 A1 | 2/2006 | Caminada et al. | |

FOREIGN PATENT DOCUMENTS

| | | | |
|---|---|---|---|
| EP | 1253399 A1 | 10/2002 | |
| EP | 1296114 A1 | 3/2003 | |
| EP | 1359391 A2 | 11/2003 | |
| WO | WO 9914557 A1 | 3/1999 | |
| WO | WO 2004046650 A1 | 6/2004 | |

* cited by examiner

*Primary Examiner*—Hezron E. Williams
*Assistant Examiner*—Samir M. Shah
(74) *Attorney, Agent, or Firm*—Lisa K. Jorgenson; Timothy L. Boller; Seed IP Law Group PLLC (57) ABSTRACT

A micro-electro-mechanical sensor includes a microstructure having a mass which is movable with respect to a rest position, according to a predetermined degree of freedom, and a displacement-detecting device for detecting a displacement of the mass according to the predetermined degree of freedom. The displacement-detecting device includes a force feedback loop of a purely analog type, which supplies electrostatic forces tending to restore the mass to the rest position in response to a displacement of the mass according to the predetermined degree of freedom.

7 Claims, 8 Drawing Sheets

MICRO-ELECTRO-MECHANICAL SENSOR WITH FORCE FEEDBACK LOOP

BACKGROUND OF THE INVENTION

1. Field of the Invention

The present invention relates to a micro-electro-mechanical sensor with force feedback loop.

2. Description of the Related Art

As is known, the use of micro-electro-mechanical systems or MEMS is increasingly widespread in various sectors of technology and has yielded encouraging results especially in the construction of inertial sensors, micro-integrated gyroscopes, and electromechanical oscillators for a wide range of applications.

Figure 1:
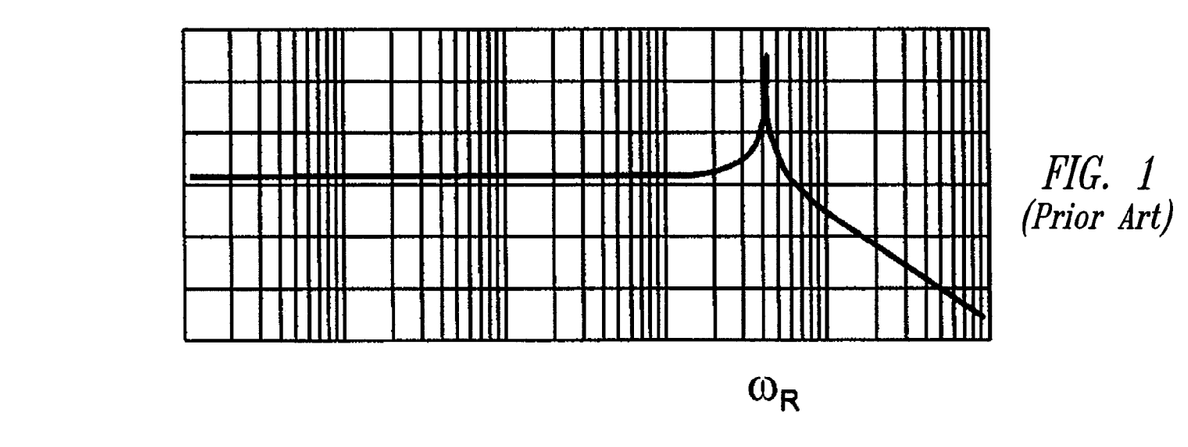
FIGS. 1 and 2 are graphs corresponding to the frequency response of a micro-electro-mechanical structure.
Figure 2:
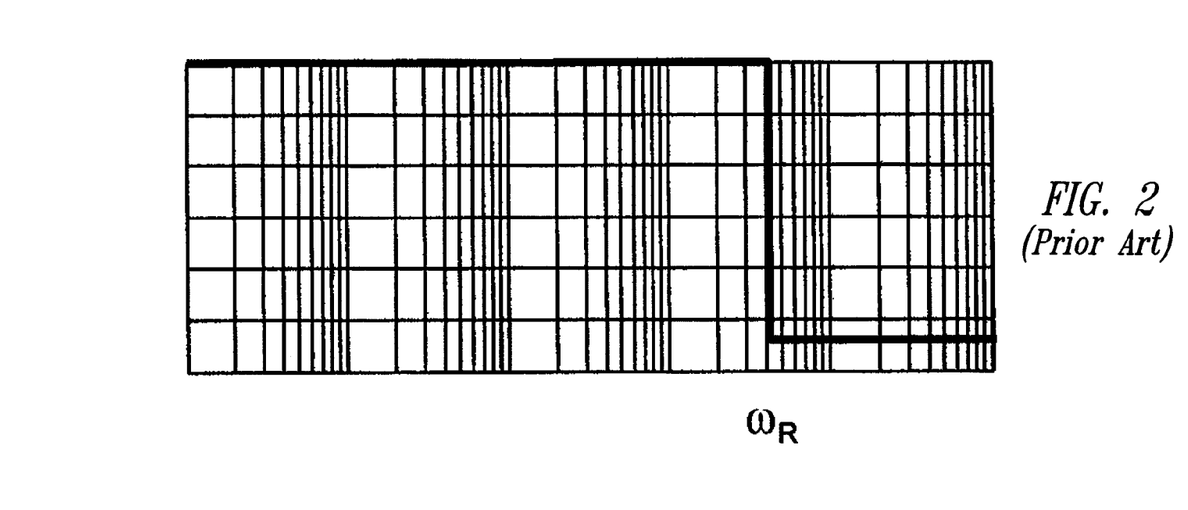

MEMS systems of this type are usually based upon micro-electro-mechanical structures comprising at least one mass, which is connected to a fixed body (stator) by means of springs and is movable with respect to the stator according to predetermined degrees of freedom. The movable mass and the stator are capacitively coupled by means of a plurality of respective comb-fingered electrodes set facing one another, so as to form capacitors. The movement of the movable mass with respect to the stator, for example on account of an external stress, modifies the capacitance of the capacitors. From this it is possible to trace back to the relative displacement of the movable mass with respect to the fixed body and hence to the applied force. Instead, by supplying appropriate biasing voltages, it is possible to apply an electrostatic force to the movable mass to set it in motion. Furthermore, in order to obtain electromechanical oscillators, the frequency response of the inertial MEMS structures is exploited, which typically is of a second-order low-pass type. By way of example, FIGS. 1 and 2 show the trend of the module and of the phase of the transfer function between the force applied to the movable mass and its displacement with respect to the stator, in an inertial MEMS structure.

Reading of many types of MEMS systems, such as, for example, inertial sensors, sensors of other types, or gyroscopes, is performed using a force feedback loop. In practice, the capacitive unbalancing due to a displacement of the movable mass is read and, by means of the force feedback loop, electrostatic forces tending to eliminate the displacement, on the basis of the capacitive unbalancing detected, are applied. The amplitude of the electrostatic forces required is indicative of the external stress acting on the movable mass and can be estimated on the basis of the signals present in the force feedback loop.

Known solutions generally envisage the use of sigma-delta modulators for transduction of the capacitive unbalancing in the force feedback loops. Reading devices of this type are undoubtedly precise and effective, in so far as the sigma-delta modulators are reliable and have a good speed of response, especially if they are made directly of hardware/firmware. However, the bitstream supplied by the sigma-delta modulator must be filtered, decimated and further processed and, hence, it is necessary to envisage purposely designed stages for each operation. Hence, currently available reading devices for MEMS are complex to produce, cumbersome and, in practice, costly.

BRIEF SUMMARY OF THE INVENTION

According to one embodiment of the present invention, a micro-electro-mechanical sensor includes a microstructure having a mass movable with respect to a rest position according to a predetermined degree of freedom, and a displacement-detecting means for detecting a displacement of the mass. The displacement-detecting means includes a force feedback loop supplying electrostatic forces tending to restore the mass to its rest position in response to the displacement of the mass. In one embodiment, the force feedback loop is an analog feedback loop.

In another embodiment, the force feedback loop includes a charge differential amplifier, a first filter and a second filter. The first filter has a first transfer function configured for imposing stability conditions on a magnitude of a gain of the force feedback loop, and the second filter has a second transfer function configured for imposing stability conditions on a phase of the gain of the force feedback loop.

In yet another embodiment, the displacement-detecting means further includes a demodulation stage coupled to the force feedback loop for receiving a raw signal and for demodulating the raw signal to generate an output signal indicative of the instantaneous angular velocity of the rotating system. The raw signal includes at least one component in phase with the displacement of the mass.

In another embodiment, a method for determining characteristics of a rotating system includes the steps of maintaining a first mass in oscillation at a resonance frequency along a first axis, coupling a second mass to the first mass via a mechanical means, determining feedback voltages via an analog force feedback loop, and applying the feedback voltages to the second mass. The feedback voltages tend to restore the second mass to its rest position.

Furthermore, the analog force feedback loop interacts with the second mass, comprising steps of receiving reading currents that are indicative of a velocity of the second mass along a second axis, converting the reading currents to reading voltages, and filtering the reading voltages to generate the feedback voltages. The reading voltages are indicative of a displacement of the second mass relative to a rest position along the second axis.

BRIEF DESCRIPTION OF THE SEVERAL VIEWS OF THE DRAWINGS

For a better understanding of the invention, an embodiment thereof is now described, purely by way of non-limiting example and with reference to the attached drawings, in which.

DETAILED DESCRIPTION OF THE INVENTION

In the ensuing description, reference will be made to the use of the invention in a micro-integrated gyroscope. This must not, however, be considered as in any way limiting the scope of the invention, in so far as the latter can be exploited in all the cases where, in a micro-electro-mechanical structure, a movable mass must be excited and continuously maintained in oscillation at a natural resonance frequency. In particular, the invention can advantageously be applied to the construction of MEMS oscillators.

Figure 3:
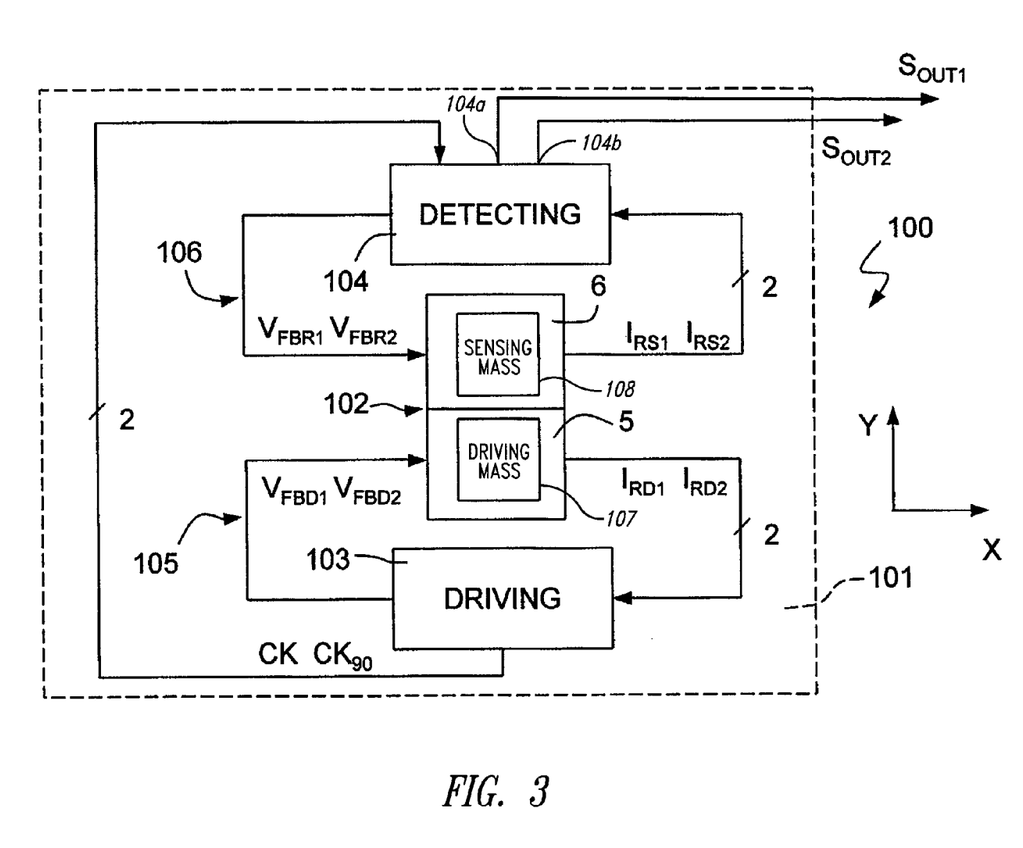
FIG. 3 is a simplified block diagram of a resonant micro-electro-mechanical system, according to one embodiment of the invention.

With reference to FIG. 3, a micro-integrated gyroscope 100 comprises a microstructure 102 made using. MEMS technology, a driving device 103, and a reading device 104 (also referred to as a detecting device), housed on a support 101. The microstructure 102, which will be illustrated in detail hereinafter, is provided with an actuation system 5 and an inertial sensor 6, which include respective movable masses. More precisely, the actuation system 5 comprises a driving mass 107, oscillating about a rest position according to a degree of freedom thereof, in particular along a first axis X. The inertial sensor 6 has a detection axis directed along a second axis Y, which is perpendicular to the first axis X, and comprises a sensing mass 108, mechanically connected to the driving mass 107 by means of springs (not illustrated), so as to be drawn in motion along the first axis X when the driving mass 107 is excited. Furthermore, the sensing mass 108 is relatively movable with respect to the driving mass 107 in the direction of the second axis Y and has thus a further degree of freedom.

The driving device 103 and the reading device 104 are connected to the microstructure 102 so as to form, respectively, a driving feedback loop 105, which includes the driving mass 107, and a sensing feedback loop 106, which includes the sensing mass 108. Furthermore, the reading device 104 has a first output 104a and a second output 104b, which supply a first output signal $S_{OUT1}$, and a second output signal $S_{OUT2}$, respectively. In particular, the first output signal $S_{out1}$ is correlated to the acceleration that the sensing mass 108 undergoes along the second axis Y; and the second output signal $S_{OUT2}$ is correlated to displacements of the sensing mass 108, once again in a direction of the second axis Y, on account of spurious drawing motions.

As clarified in greater detail in the ensuing description, the driving device 103 exploits the driving feedback loop 105 for maintaining the driving mass 107 in self-oscillation along the first axis X at its resonance frequency $\omega_R$ (for example, 4 kHz). Furthermore, the driving device 103 generates a first clock signal CK and a second clock signal $CK_{90}$, 90° out of phase, and supplies them to the reading device 104, for the purpose of synchronizing the operations of driving and reading of the microstructure 102.

The reading device 104 uses the sensing feedback loop 106 for reading the displacements of the sensing mass 108, which are determined by the resultant of the forces acting on the sensing mass 108 itself along the second axis Y. In practice, the sensing feedback loop 106 performs a force feedback for maintaining the sensing mass 108 in a rest position. The intensity of the electrostatic force to be applied is correlated to the displacement of the sensing mass 108 and hence to the forces acting thereon and can be estimated in a way in itself known using the signals (voltages or currents) present in the sensing feedback loop 106.

The gyroscope 100 operates in the way described hereinafter. The driving mass 107 is set in oscillation along the first axis X and draws along in motion, in the same direction, also the sensing mass 108. Consequently, when the microstructure 102 rotates about an axis perpendicular to the plane of the axes X, Y with a certain instantaneous angular velocity, the sensing mass 108 is subject to a Coriolis force, which is parallel to the second axis Y and is proportional to the instantaneous angular velocity of the microstructure 102 and to the linear velocity of the two masses 107, 108 along the first axis X. More precisely, the Coriolis force ($F_c$) is given by the equation:

$$F_c = 2M_s \Omega X'$$

where $M_s$ is the value of the sensing mass 108, $\Omega$ is the angular velocity of the microstructure 102, and X' is the linear velocity of the two masses 107, 108 along the first axis X.

In effect, also the driving mass 107 is subject to a Coriolis force; however, said force is countered by the constraints that forces on the driving mass 107 to move exclusively along the first axis X.

The Coriolis force and the Coriolis acceleration to which the sensing mass 108 is subjected are measured by the inertial sensor 6. The response of the inertial sensor 6 can, however, contain also a component due to spurious drawing motions, which do not correspond to actual rotations of the microstructure 102 and are due to imperfections in the constraints of the driving mass 107 or in the mechanical coupling with the sensing mass 108.

In particular, the first output signal $S_{OUT1}$ is correlated to the Coriolis force (and acceleration) and thus also to the instantaneous angular velocity of the microstructure 102; the second output signal $S_{OUT2}$ is instead correlated to the spurious drawing motions. Furthermore, the first output signal $S_{OUT1}$ is modulated in amplitude proportionally to the Coriolis force and, consequently, to the instantaneous angular velocity of the microstructure 102, with carrier centered at the resonance frequency $\omega_R$. The band of frequencies associated to the modulating quantity, i.e., the instantaneous angular velocity, is, however, far lower than the resonance frequency $\omega_R$ (for example, 10 Hz).

Figure 4:
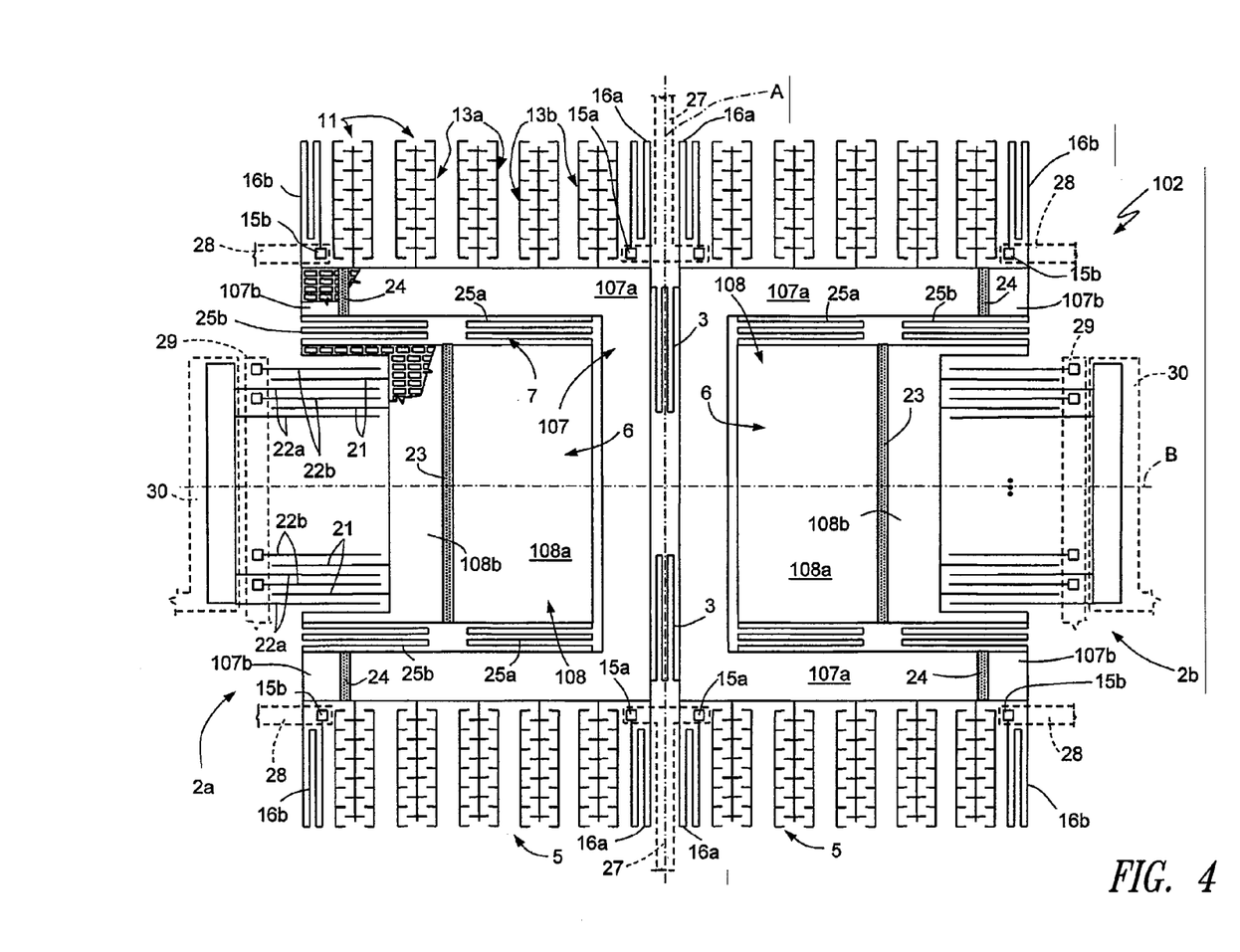
FIG. 4 is a plan view of a microstructure illustrated in FIG. 3, according to one embodiment of the invention.
Figure 4A:
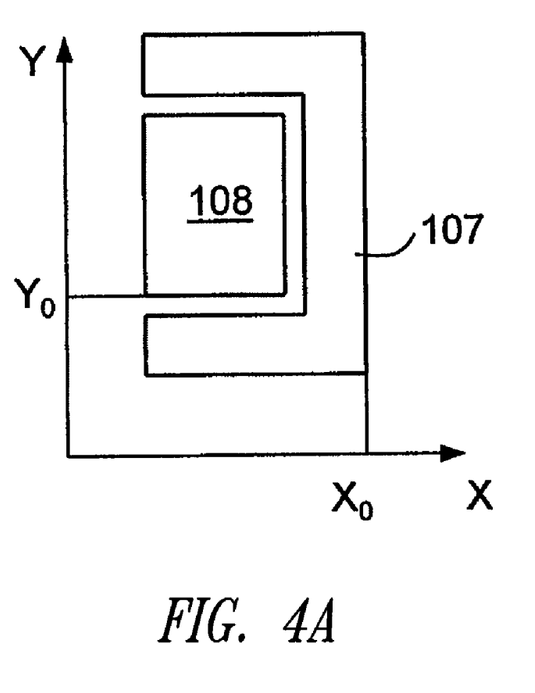
FIG. 4A is a simplified view of a part of the microstructure of FIG. 4, according to one embodiment of the invention.

FIG. 4 shows the complete layout of the microstructure 102, which is of the general type described in the patent application EP-A-1 253 399. The microstructure 102 is formed by two parts 2a, 2b, which are symmetrical with respect to a central axis of symmetry designated by A (parallel to the second axis Y) and are connected together via two central springs 3, arranged symmetrically with respect to a barycentric axis designated by B and parallel to the first axis X. In FIG. 4a designated by $X_0$ and $Y_0$ are a rest position of the driving mass 107 with respect to the first axis X and, respectively, a rest position of the sensing mass 108 with respect to the second axis Y.

Each part 2a, 2b comprises a respective actuation system 5, a respective inertial sensor 6, and a mechanical connection 7, which connects the actuation system 5 to the inertial sensor 6. In FIG. 3, the microstructure 102 has been sketched in a simplified way with reference to just one of the two parts 2a, 2b.

In detail, the actuation system 5 comprises the driving mass 107 having an open concave shape (C shape), movable actuation electrodes 11 connected to the driving mass 107, and first and second fixed actuation electrodes 13a, 13b, comb-fingered to the movable actuation electrodes 11. The driving mass 107 is supported by first and second anchorages 15a, 15b via two first and two second anchoring springs 16a, 16b connected to the driving mass 107 in the proximity of the outer edges of the driving mass 107 itself.

The inertial sensor 6 comprises the sensing mass 108 and movable sensing electrodes 21, comb-fingered to first and second fixed sensing electrodes 22a, 22b. The sensing mass 108 is surrounded on three sides by the driving mass 107 and is supported thereby through two first coupling springs 25a and two second coupling springs 25b. The coupling springs 25a, 25b constitute the mechanical connection 7 and are connected to the sensing mass 108 in the proximity of the edges thereof. The movable sensing electrodes 21 extend from a side of the sensing mass 108 not facing the driving mass 107.

The sensing mass 108 is divided into a first part 108a and a second part and 108b by a first insulating region 23; likewise, the driving mass 107 is divided into a main portion 107a and two end portions 107b by two second insulating regions 24.

In detail, the first insulating region 23 extends approximately parallel to the central axis of symmetry A so that the first part 108a of the sensing mass 108 is supported by and connected to the driving mass 107 only via the first coupling springs 25a, whilst the second part 108b of the sensing mass 108 is supported by and connected to the driving mass 107 only via the second coupling springs 25b.

Furthermore, the second insulating regions 24 extend transversely to the respective C-shaped arms so that the main portion 107a of the driving mass 107 is connected only to the first coupling springs 25a and to the first anchoring springs 16a, whereas the end parts 107b of the driving mass 107 is connected only to the second coupling springs 25b and to the second anchoring springs 16b. The position of the second insulating regions 24 is moreover such that the movable actuation electrodes 11 extend from the main portion 107a of the driving mass 107 and are electrically connected thereto.

Actuation biasing regions 27, of a buried type, are connected to the first anchoring regions 15a; first detection biasing regions 28, which are also of a buried type, are connected to the second anchoring regions 15b; second detection biasing regions 29 are connected to the first fixed sensing electrodes 22a; and third detection biasing regions 30 are connected to the second fixed sensing electrodes 22b.

In this way, the first part 108a of the sensing mass 108, the first coupling springs 25a, the main portion 107a of the driving mass 107, the movable actuation electrodes 11, the first anchoring springs 16a, and the first anchoring regions 15a are all set at one and the same potential, applied via the actuation biasing regions 27, and are electrically insulated, by the insulating regions 23, 24, from the rest of the suspended structures, which include the second part 108b of the sensing mass 108, the second coupling springs 25b, the end portions 107b of the driving mass 107, the second anchoring springs 16b and the second anchoring regions 15b, biased via the first detection biasing regions 28.

Figure 5:
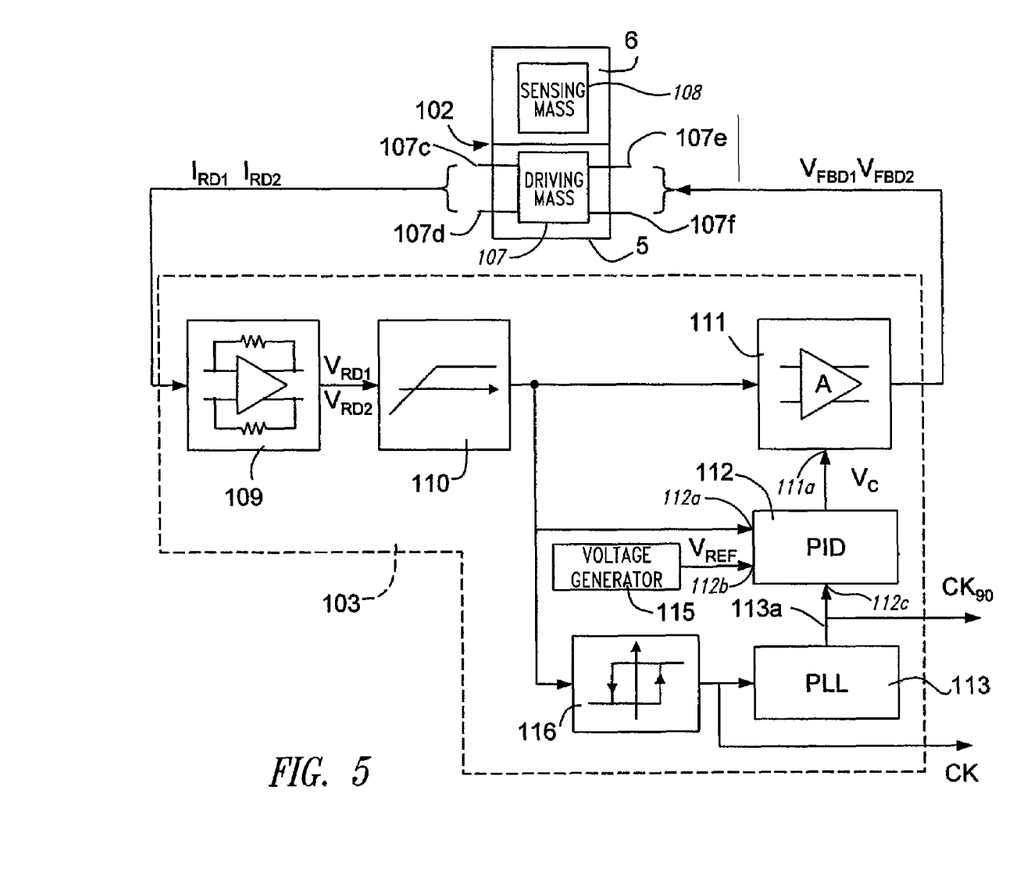
FIG. 5 is a more detailed block diagram of a part of the micro-electro-mechanical system of FIG. 3, according to one embodiment of the invention.

With reference to FIG. 5, the driving device 103 comprises a transimpedence amplifier 109, a differentiator stage 110, a variable-gain-amplifier (VGA) circuit 111, a controller 112 and a phase-locked-loop (PLL) circuit 113.

The transimpedence amplifier 109 is of a fully differential type and has a pair of inputs connected to reading outputs 107c, 107d of the actuation system 5 for receiving first reading currents $I_{RD1}$, $I_{RD2}$, which are correlated to the linear velocity of oscillation of the driving mass 107 along the first axis X. On the outputs of the transimpedence amplifier 109 there are hence present first reading voltages $V_{RD1}$, $V_{RD2}$, which also indicate the linear velocity of oscillation of the driving mass 107 along the first axis X. Also the first reading voltages $V_{RD1}$, $V_{RD2}$ have equal amplitude and frequency and are 180° out of phase.

Figure 6:
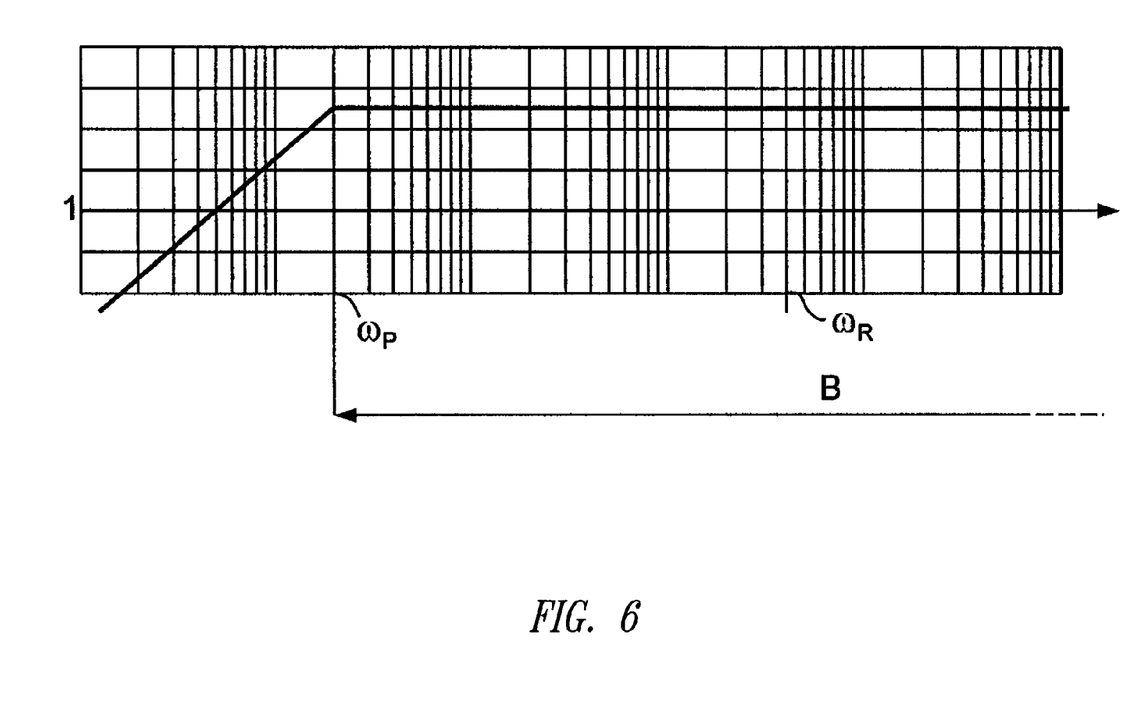
FIG. 6 is a graph corresponding to the frequency response of an element of the block diagram of FIG. 5, according to one embodiment of the invention.

The differentiator stage 110 is cascaded to the transimpedence amplifier 109. The transfer function of the differentiator stage 110, which is of a high-pass type and has a zero at zero frequency and a pole at a frequency cop lower than the resonance frequency $\omega_R$ of the microstructure 102, is of the type $$T(s) = K\frac{s}{1+sT_P}$$

where s is a complex variable, K is a constant coefficient and $T_p=1/\omega_P$ is the time constant associated to the pole of the differentiator stage 110 (see also FIG. 6). Preferably, the coefficient K is such that, for frequencies higher than the frequency $\omega_P$ of the pole, the gain $K/T_p$ of the differentiator stage 110 is greater than unity. In practice, then, the differentiator stage 110 amplifies the harmonic components of the first reading voltages $V_{RD1}$, $V_{RD2}$ close to the resonance frequency $\omega_R$, whereas possible constant components are eliminated (for example offset voltages). Furthermore, in the band-pass B of the differentiator 110, i.e., for frequencies greater than the frequency $\omega_P$ of the pole, the offset introduced by the differentiator stage 110 is substantially zero, since the contributions of the pole and of the zero compensate one another.

The VGA circuit 111 is connected between the differentiator stage 110 and actuation inputs 107e, 107f of the driving mass 107 and supplies driving feedback voltages $V_{FBD1}$, $V_{FBD2}$ having such magnitude and phase as to maintain the driving mass 107 in oscillation at the resonance frequency $\omega_R$. In particular, the magnitude of the driving feedback voltages $V_{FBD1}$, $V_{FBD2}$ depends upon the gain of the VGA circuit 111, which is determined by the controller 112 so that the overall gain of the driving feedback loop 105 is a unity gain.

The controller 112 is preferably of switched-capacitors PID type and has first inputs 112a connected to the outputs of the differentiator stage 110, for receiving the first reading voltages $V_{RD1}$, $V_{RD2}$ amplified and depurated from any D.C. component. A second input 112b of the controller 112 is connected to a voltage generator 115, supplying a reference voltage $V_{REF}$. The controller 112 moreover has an output, which is connected to a control input 111a of the VGA circuit 111 and supplies a control voltage $V_c$. In practice, the controller 112 generates the control voltage $V_c$ on the basis of the difference between the voltages on the first inputs 112a and the reference voltage $V_{REF}$. Preferably, the gain of the VGA circuit 111 depends in a linear way upon the control voltage $V_c$.

Figure 7:
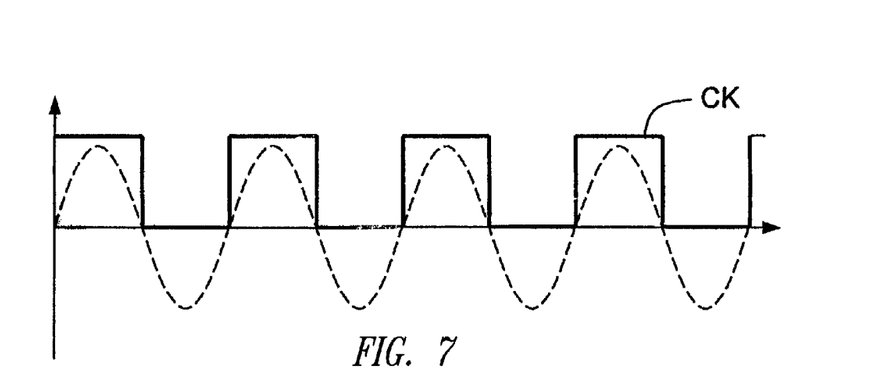
FIGS. 7-9 are graphs which illustrate plots of quantities relating to the micro-electro-mechanical system of FIG. 3, according to one embodiment of the invention.
Figure 8:
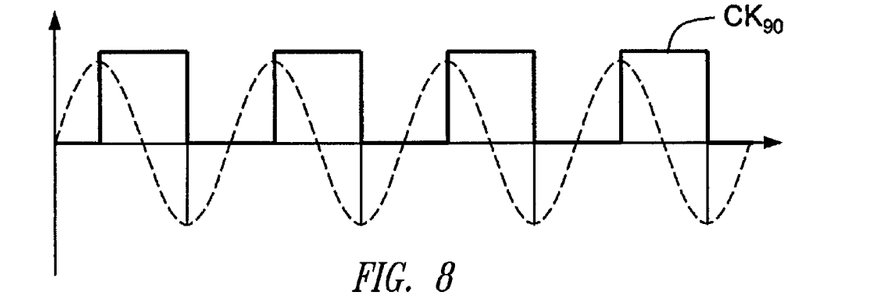

The PLL circuit 113 has inputs connected to the outputs of the differentiator stage 110 through a comparator 116, of an analog type with hysteresis, and an output 113a, connected to a clock input 112c of the controller 112. The comparator 116 supplies at output to the PLL circuit 113 the first clock signal CK, which is a square-wave voltage having a first value in a first half-period, in which the voltages on the outputs of the differentiator stage 110 have a respective sign, and a second value in a second half-period, in which the voltages on the outputs of the differentiator stage 110 have a sign opposite to the one corresponding to the first half-period. In practice, the first clock signal switches at each change of sign of the first reading voltages $V_{RD1}$ $V_{RD2}$, which are in phase with the voltages on the outputs of the differentiator stage 110. Hysteresis prevents multiple switching due to noise in the proximity of the changes of sign of the voltages on the outputs of the differentiator stage 110. On the output 113a, moreover, the PLL circuit 113 supplies the second clock signal $CK_{90}$. In particular, (see FIGS. 7 and 8) the first clock signal CK has edges synchronized with zero-crossing instants of the first reading voltages $V_{RD1}$, $V_{RD2}$ (one of which is represented with a dashed line). The second clock signal $CK_{90}$ is 90° out of phase with respect to the first clock signal CK and is in phase with the peak values of the first reading voltages $V_{RD1}$, $V_{RD2}$. In other words, the first clock signal CK and the second clock signal $CK_{90}$ are in phase, respectively, with the linear velocity and with the displacement of the driving mass 107 along the first axis X.

The output of the comparator 116 and the output 113a of the PLL circuit 113 are moreover connected to the reading device 104.

As mentioned previously, the driving device 103 operates on the overall gain and phase of the driving feedback loop 105, so as to maintain the driving mass 107 constantly in oscillation at the resonance frequency $\omega_R$. The controller 112 intervenes first of all upon triggering of the oscillation by increasing the gain of the VGA circuit 111, which is then reduced so that the overall gain of the driving feedback loop 105 is substantially a unity gain. In the second place, the controller 112 prevents, following upon external stresses such as shocks or vibrations, the oscillations of the microstructure 102 from degenerating into limit cycles. In the absence of the controller 112, in fact, the response of the microstructure 102 can depart from the domain of linearity and hence can set up uncontrolled oscillating motions. The effect of the external stresses is instead limited by the controller 112, which temporarily reduces the gain of the VGA circuit 111. Finally, the action of the controller 112 enables compensation of variations with respect to the nominal value and possible drifts of the resonance frequency $\omega_R$.

The controller 112 uses the second clock signal $CK_{90}$ for sampling the voltages on the outputs of the differentiator stage 110 in a consistent way, once again with the same phase. Preferably, the samples are taken at instants corresponding to edges of the second clock signal $CK_{90}$, i.e., to the peak values (see FIG. 8). As already explained, the synchronization of the second clock signal $CK_{90}$ is ensured by the PLL circuit 113.

Figure 9:
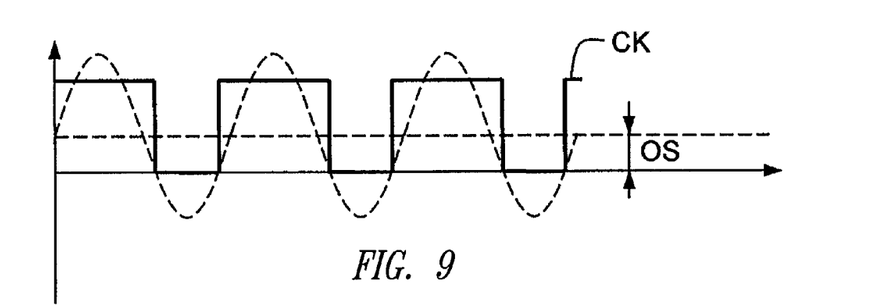

The differentiator stage 110 amplifies the first reading voltages $V_{RD1}$, $V_{RD2}$ and eliminates any possible intrinsic offset of the microstructure 102 or any offset introduced by the transimpedence amplifier 109. The elimination of the offset is particularly important for correct operation of the PLL circuit 113 and, consequently, of the controller 112. As illustrated in FIG. 9, when an offset OS is present, the first reading voltages $V_{RD1}$, $V_{RD2}$ do not change sign at each half-period, but at different instants. Consequently, the comparator 116 switches at instants in which the phase of the first reading voltages $V_{RD1}$, $V_{RD2}$ is not known and phase-locking fails. Thus, the first and second clock signals CK, $CK_{90}$ do not contain useful information because their edges do not correspond to the changes in sign or to the peak values of the first reading voltages $V_{RD1}$, $V_{RD2}$. Instead, the differentiator stage 110 suppresses the offset, and hence the comparator 116 switches at instants significant for phase-locking. For this reason, the first and second clock signals CK, $CK_{90}$ are synchronized to the first reading voltages $V_{RD1}$, $V_{RD2}$ with a zero and 90° phase lag, respectively. Also the controller 112 is hence correctly clocked. The use of the differentiator stage 110 is additionally advantageous because it enables amplification of the first reading voltages $V_{RD1}$, $V_{RD2}$, without introducing any phase lag around the resonance frequency $\omega_R$ of the microstructure 102.

As a whole, the structure of the driving device 103 is far simpler than that of the devices that use sigma-delta converters. Nevertheless, oscillation frequency control is in any case accurate and is capable of rapidly compensating for any possible external disturbance.

Figure 10:
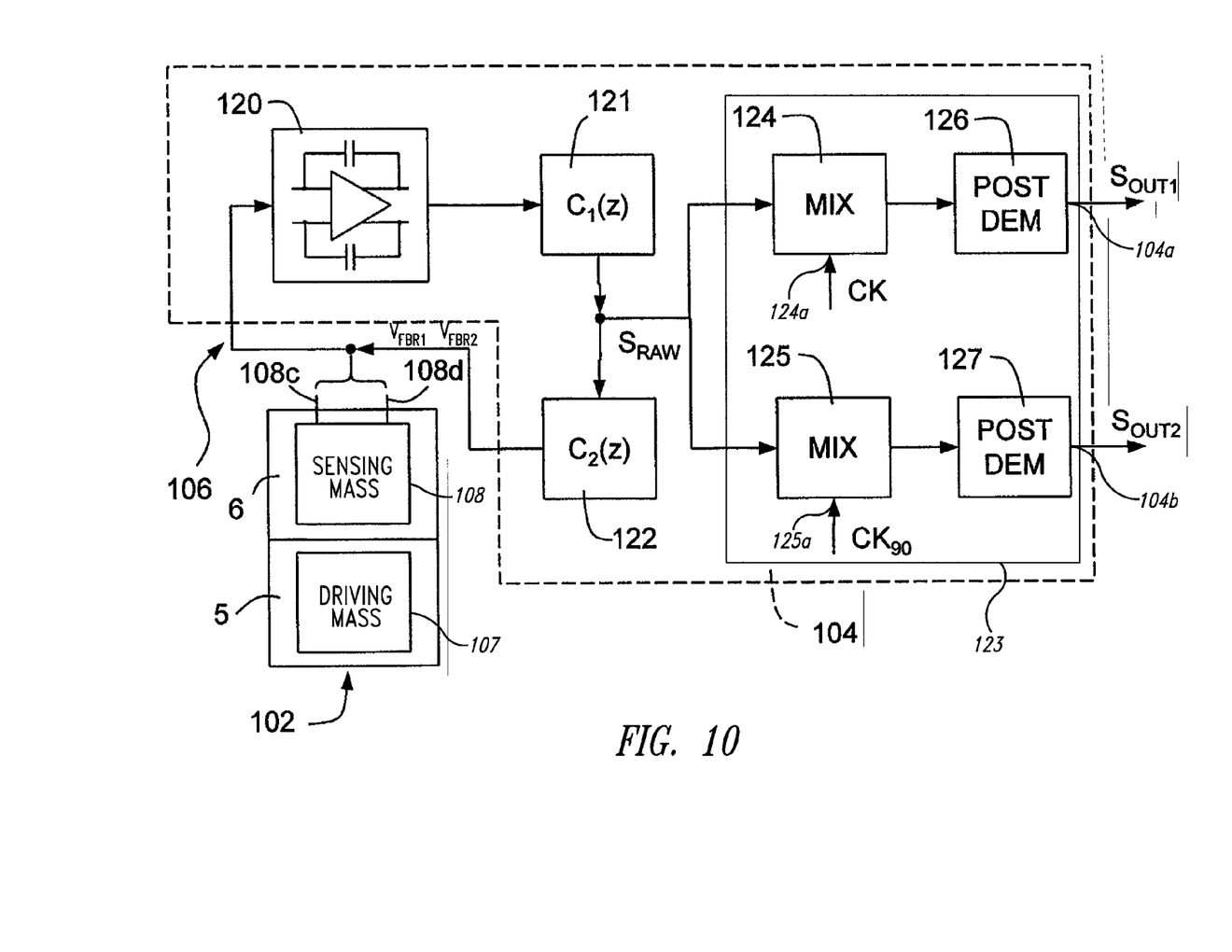
FIG. 10 is a more detailed block diagram of a part of the micro-electro-mechanical system of FIG. 3, according to one embodiment of the invention.

With reference to FIG. 10, the reading device 164 comprises a charge amplifier 120 and a first filter 121 and a second filter 122, which are included in the sensing feedback loop 106, together with the sensing mass 108. Furthermore, the reading device 104 is provided with a demodulation stage 123, comprising a first demodulator 124 and a second demodulator 125 (mixers), associated to which are respective post-demodulation filters 126, 127. All the components 120-127 that form the reading device 104 are of a discrete-time analog type and, in particular, are made by means of fully differential switched-capacitor circuits. The electrical quantities used are hence sampled, but not quantized. Thanks to the discrete-time operation, the reading device 104 can use a single pair of terminals 108c, 108d of the sensing mass 108 in time-division both for reading and for actuation.

The charge amplifier 120 has inputs connected to the terminals 108c, 108d of the sensing mass 108 for receiving second reading currents $I_{RS1}$, $I_{RS2}$, which are correlated to the linear velocity of oscillation of the sensing mass 108 along the second axis Y. On account of the charge amplification, on the outputs of the charge amplifier 120 second reading voltages $V_{RS1}$, $V_{RS2}$ are present, which indicate the displacement of the sensing mass 108 along the second axis Y; also the second reading voltages $V_{RS1}$, $V_{RS2}$ have equal magnitude and frequency and are 180° out of phase with respect to one another.

The first filter 121 and the second filter 122 are cascaded together, downstream of the charge amplifier 120. In greater detail, the first filter 121 has a transfer function $C_1(z)$ of a low-pass type and operates so as to provide a stability condition on the magnitude of the gain of the sensing feedback loop 106. On the outputs of the first filter 121a raw signal $S_{RAW}$ is present, which is correlated both to the instantaneous angular velocity of the microstructure 102 and to the spurious motions of drawing.

The second filter 122 has a transfer function $C_2(Z)$ configured so as to recover the delays introduced by the first filter 121 and impose a condition of stability on the phase of the gain of the sensing feedback loop 106. Consequently, the transfer function $C_1(z)$ of the first filter 121 and the transfer function $C_2(z)$ of the second filter 122 ensure, in combination, the stability of the sensing feedback loop 106. In practice, the second filter 122 operates by supplying reading feedback voltages $V_{FBR1}$, $V_{FBR2}$ to the terminals 108c, 108d of the sensing mass 108.

The demodulation stage 123 is connected to the output of the first filter 121, for sampling the raw signal $S_{RAW}$, which is supplied to the demodulators 124, 125. It should be noted that the point of the sensing feedback loop 106, from which the raw signal $S_{RAW}$ is sampled, is the most favorable as regards the signal-to-noise ratio. The first demodulator 124 has a demodulation input 124a connected to the driving device 103 for receiving the first clock signal CK; and the second demodulator 125 has a demodulation input 125a connected to the driving device 103 for receiving the second clock signal $CK_{90}$. The outputs of the first post-demodulation filter 126 and of the second post-demodulation filter 127 form the first output 104a and the second output 104b, respectively, of the reading device 104.

As mentioned previously, the sensing feedback loop 106 performs a negative force feedback on the sensing mass 108 of the inertial sensor 6. In response to a displacement of the sensing mass 108 along the second axis Y, the reading device 104, by means of the reading feedback voltages $V_{FBR1}$, $V_{FBR2}$, applies electrostatic forces tending to bring the sensing mass 108 itself back to its rest position $Y_0$.

The raw signal $S_{RAW}$ is generated within the sensing feedback loop 106 and is correlated to the displacements of the sensing mass 108 along the second axis Y. Furthermore, the raw signal $S_{RAW}$ is amplitude-modulated in the DSB-SC (Double Side Band-Suppressed Carrier) mode and is the sum of two components. A first component, useful for measurement of the instantaneous angular velocity, is in phase with the displacement of the sensing mass 108 and has an amplitude correlated to the Coriolis acceleration (along the second axis Y), to which the sensing mass 108 itself is subjected on account of the oscillation along the first axis X and of the rotation of the microstructure 102. A second component, 90° out of phase, is correlated to the spurious drawing motions. For example, if the driving mass 107 oscillates in a direction which is not perfectly aligned to the first axis X, the sensing mass 108 can be driven in oscillation along the second axis Y even in the absence of rotation of the microstructure 102.

Both of the contributions have the same carrier frequency, i.e., the resonance frequency $\omega_R$ of the driving mass 107, but are 90° out of phase with respect to one another. In particular, the first contribution is in phase with the first clock signal CK, whereas the second contribution is in phase with the second clock signal $CK_{90}$.

The first output signal $S_{OUT1}$, and the second output signal $S_{OUT2}$ are generated using, respectively, the first clock signal CK and the second clock signal $Ck_{90}$ for demodulating the raw signal $S_{RAW}$. For this reason, the first output signal $S_{OUT1}$ corresponds to the first contribution, and its amplitude is hence correlated to the instantaneous angular velocity of the microstructure 102; and the second output signal $S_{OUT2}$ corresponds to the second contribution, and its amplitude is correlated to the amplitude of the spurious drawing motions.

The post-demodulation filters 126, 127 eliminate the frequency components $2\omega_R$ from the first output signal $S_{OUT1}$ and from the second output signal $S_{OUT2}$ after demodulation.

The reading device 104 is advantageous in so far as it enables a precise reading of the displacements of the sensing mass 108 to be obtained, thanks to the force feedback, only with the use of analog circuits. For this reason, the reading device 104 is far simpler to produce as compared to traditional feedback loops based upon sigma-delta modulators.

The gyroscope 100 affords another advantage, which derives from the layout of the microstructure 102. Thanks to the location of the insulating regions 23, 24, in fact, the driving mass 107 and the sensing mass 108 can be biased independently from one another. In particular, it is possible to maintain the movable actuation electrodes 11 of the driving mass 107 connected to ground irrespective of the voltages that are supplied by the reading device 104 to the sensing mass 108 in order to exert the force feedback.

Finally, it is evident that modifications and variations may be made to the resonant micro-electro-mechanical system described herein, without thereby departing from the scope of the present invention, as defined in the annexed claims.

In particular, the invention can be advantageously exploited for producing electromechanical oscillators of any type, as already mentioned previously. Furthermore, the reading device according to the invention can be used in gyroscopes having microstructures different from the ones described herein. For example, the driving mass and the sensing mass could be in direct electrical connection with one another, without insulating regions. In this case, it is, however, preferable to associate an offset-compensation stage to the transimpedence amplifier. Alternatively, it is also possible to use a single mass with actuation and detection systems for two independent axes.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The invention claimed is:

1. A method for determining characteristics of a rotating system, comprising the steps of:
   maintaining a first mass in oscillation at a resonance frequency along a first axis;
   coupling a second mass to the first mass via a mechanical means;
   determining feedback voltages via an analog force feedback loop, the analog force feedback loop acting on the second mass, comprising the steps of:
      receiving reading currents indicative of a velocity of the second mass along a second axis,
      converting the reading currents to reading voltages, the reading voltages indicative of a displacement of the second mass relative to a rest position along the second axis, and
      filtering the reading voltages to generate the feedback voltages; and
   applying the feedback voltages to the second mass, the feedback voltages tending to restore the second mass to the rest position.

2. The method of claim 1, wherein the step of converting comprises an analog converting means.

3. The method of claim 1, wherein the step of filtering comprises an analog filtering means.

4. The method of claim 1, wherein the step of filtering comprises the steps of:
   filtering the reading voltages via a first filter to generate a raw signal, the first filter configured for imposing stability conditions on a magnitude of a gain of the analog force feedback loop; and
   filtering the raw signal via a second filter to generate the feedback voltages, the second filter configured for imposing stability conditions on a phase of the gain of the analog force feedback loop.

5. The method of claim 4, further comprising the step of demodulating the raw signal to generate an output signal indicative of the instantaneous angular velocity of the rotating system.

6. An integrated micro-electro-mechanical gyroscope, comprising:
   means for maintaining a first mass in oscillation at a resonance frequency along a first axis;
   means for mechanically coupling a second mass to the first mass;
   means for determining feedback voltages via an analog force feedback loop, the analog force feedback loop acting on the second mass, including
      means for receiving reading currents indicative of a velocity of the second mass along a second axis,
      means for converting the reading currents to reading voltages, the reading voltages indicative of a displacement of the second mass relative to a rest position along the second axis, and
      means for filtering the reading voltages to generate the feedback voltages; and
   means for applying the feedback voltages to the second mass, the feedback voltages tending to restore the second mass to the rest position.

7. The integrated micro-electro-mechanical gyroscope of claim 6, wherein the means for filtering comprises:
   first filtering means for filtering the reading voltages to generate a raw signal and impose stability conditions on a magnitude of a gain of the analog force feedback loop; and
   second filtering means for filtering the raw signal to generate the feedback voltages and impose stability conditions on a phase of the gain of the analog force feedback loop.

* * * * *